United States Patent Office 3,652,484
Patented Mar. 28, 1972

3,652,484
THERMOPLASTIC MOLDING COMPOSITIONS BASED ON SATURATED POLYESTERS
Klaus Weissermel, Kelkheim, Taunus, Rudolf Uebe, Hofheim, Taunus, and Walter Herwig, Frankfurt am Main, Germany, assignors to Farbwerke Hoechst Aktiengesellschaft vormals Meister Lucius & Bruning, Frankfurt am Main, Germany
No Drawing. Filed July 2, 1969, Ser. No. 838,667
Claims priority, application Germany, July 2, 1968, P 17 69 713.1
Int. Cl. C08g 51/50
U.S. Cl. 260—29.15 B
16 Claims

ABSTRACT OF THE DISCLOSURE

Molding compositions from linear saturated polyesters, inert inorganic solid materials or ionic copolymers, and silicon compounds of Formula I, II or III (I) $\quad R_m Si(OR_1)_{4-m}$ (in which $m$ represents zero or a whole number from 1 to 3)

(II) 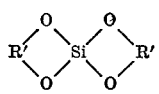

(III) 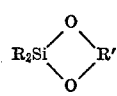

or mixtures of these compounds, which molding compositions may be shaped in the thermoplastic range and from which molded articles are obtained which can easily be removed from the mold.

---

The present invention relates to thermoplastic molding compositions derived from saturated polyesters.

It has been proposed to work up polyesters from aromatic dicarboxylic acids and aliphatic or cycloaliphatic diols into crystallized molded articles by injection-molding. In British patent specification 1,104,089 it has been described to admix finely divided, solid inorganic substances to the polyethylene terephthalate to increase the speed of crystallization of the injection-molded polyester mass in the mold. A high crystallinity ensures hardness, dimensional stability and stability in the mold even at elevated temperatures. This high crystallinity must be attained as rapidly as possible because the residence time in the mold is part of the molding period during injection-molding and the length thereof is one of the factors determining the economy of the process. In addition to adding the aforementioned crystallization auxiliaries, a second measure is required to injection-mold polyesters within economically reasonable molding periods, which consists in heating the injection-mold. In the case of polyethylene terephthalate, the temperature of the mold generally lies within the range of from 120° to 150° C. It is especially this measure which involves an inconvenient problem presenting itself during the work-up, i.e. the problem of removing the molded articles from the mold. Well nucleated polyethylene terephthalate attains a crystallinity of about 35% with short residence times in a mold heated at 140° C. With a second order transition temperature of 85° C., this crystallinity does not suffice to prevent deformation when subjecting a molded article at 140° C. to a high mechanical load. This means that when the molded article is ejected from the heated mold, not only a good crystallinity, but also the easy release of the molded article from the mold is a prerequisite for the satisfactory quality of the molded article. However, if the molded article sticks to the mold it is distorted by a non-uniform release and by the pressure of the ejector pins. The preparation of the molds by waxing or spraying with mold release agents is time-consuming, cumbersome and inaccurate and, therefore, prevents the process from being carried out in an economic manner.

Now we have found that a thermoplastic molding composition comprising:

(a) A linear saturated polyester of an aromatic dicarboxylic acid and, optionally, an amount of up to 10% by weight of an aliphatic dicarboxylic acid, with a saturated aliphatic or cycloaliphatic diol, (b) 0.05 to 2% by weight, preferably 0.2 to 1% by weight, calculated on the polyester, of an inert, inorganic solid material, or 0.3 to 4.% by weight, preferably 0.4 to 2% by weight, calculated on the polyester, of an ionic copolymer derived from α-olefins and the salts of α,β-unsaturated carboxylic acids and uni-, bi- or trivalent metals, and 0.05 to 2% by weight, preferably 0.1 to 0.5% by weight, calculated on the polyester, of a silicon compound of Formulae I, II, III, or mixtures of these compounds (I) $\quad R_m Si(OR_1)_{4-m}$ (in which $m$ represents zero or a whole number from 1 to 3)

(II) 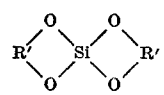

(III) 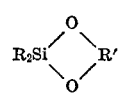

wherein R, $R_1$ and $R_2$ represent identical or different alkyl-, cycloalkyl- aryl- or aralkyl groups containing up to 20, preferably up to 12 carbon atoms, and wherein $R^1$ represents an alkylene-, cycloalkylene-, aralkylene- or arylene group, which may also contain either oxygen atoms, and which contain up to 10 carbon atoms, preferably up to 7 carbon atoms, lends itself with special advantage to injection-molding.

The good removability from the mold of the molding compositions according to the invention is especially noteworthy. It is important that this effect becomes fully effective already after very short residence times in the mold, which may partially be less than 5 seconds, which phenomenon is accompanied by an accelerated crystallization. Polyethylene terephthlate which had only been nucleated with talcum exhibited, on being injection-molded into a mold heated at 140° C., a density of 1.372 after a residence time in the mold of 2 seconds, and a density of 1.378 after a residence time in the mold of 60 seconds. When the same granules used as the initial material had previously been coated with 0.1% by weight of silicon tetrabutylate, the molded pieces had a constant level of density of from 1.377 to 1.379, independent of the residence times in the mold. Furthermore, the especially high surface gloss of the molded articles is remarkable.

In the process of the invention, polyethylene terephthalate is preferably used as the linear polyester. However, other polyesters, for example poly-cyclohexane-(1,4)-dimethylol terephthalate may also be used. It is also possible to use modified polyethylene terephthalates which contain, in addition to terephthalic acid, other aromatic or aliphatic dicarboxylic acids as structural units, for example isophthalic acid, naphthalene-(1,6) - dicarboxylic acid or adipic acid. Furthermore, there may be used modified polyethylene terephthalates which contains, in addition to ethylene glycol, other aliphatic diols such, for example, as neopentyl glycol or butanediol-(1,4) as the alcoholic component. Polyesters from hydroxycarboxylic acids may also be used. The polyesters should have a reduced specific viscosity within the range of from 0.6 to 2.0 dl./g., preferably within the range of from 0.9 to 1.6 dl./g. (measured in a 1% solution in a 60:40 by weight mixture of phenol and tetrachloroethane at 25° C.). Polyesters having a reduced specific viscosity within the range of from 1.1 to 1.5 dl./g. may be used with special advantage.

As inorganic inert solid materials there may be used, for example, silicates such as glass powder, talcum and kaolin, metal oxides such as magnesium oxide, antimony trioxide, titanium dioxide, aluminum oxide, calcium carbonate or alkali metal or alkaline earth metal fluorides. The materials should have a particle size below 5 microns, preferably below 2 microns. As ionic copolymers derived from α-olefins and α,β-unsaturated carboxylic acids, there may be mentioned, for example: copolymers from ethylene with acrylic acid, methacrylic acid, ethacrylic acid or copolymers from α-olefins and α,β-unsaturated dicarboxylic acids such as copolymers from ethylene and maleic acid or itaconic acid. These ionic copolymers should contain metal ions or mono- to trivalent metals, preferably of metals of Groups I to III of the Periodic Table.

As silion compounds there may be used, for example, orthosilicic acid esters, such as silicon tetrabutylate, silicon tetraoctylate, silicon tetradodecylate, silicon tetranaphthylate, bis - 2,2' - hydroxyethoxy)-silane, bis (tetramethylene - 1,4-dihydroxy)-silane, bis-(pentamethylene-1,5 - dihydroxy) - silane, furthermore silanes such as dimethyl-dibutoxysilane, diethyl-dibutoxysilane, dipropyl-dibutoxysilane, dibutyl-dibutoxysilane, dimethyl - (2,2'-hydroxy-diethoxy)-silane, dibutyl - (2,2' - hydroxy-diethoxy)-silane. The preparation these compounds is described, for example, in Houben-Weyl, vol. VI, part 2, p. 71 and in "Zeitschrift für Makromolekulare Chemie," 11 (1953), p. 51 et seq.

The polyester mass which may be injection-molded is prepared for example, as follows: The polyester granules are subjected to rotation together with the nucleating agent and the silicon compound, then the product is homogenized in an extruder by melting and worked up by granulation into a form which lends itself to further processing.

However, the nucleating agent and the silicon compound may also be added to the polyester material one after the other. The nucleating agent is then added alone prior to, during or after the polycondensation whereby granules are obtained which are nucleated in an especially uniform manner. Then the granules are coated with the silicon compound which is applied either as such or dissolved in a solvent which is removed subsequently. The polyester mass obtained in this manner can directly be injection-molded into molded articles.

The general working direction is that all operations have to be carried out with the exclusion of moisture to prevent the degradation of the polyester. The polyester masses shall preferably contain less than 0.01% by weight of water. When a rapid crystallization in the injection machine is to be attained, it is necessary to maintain the mold at a temperature of at least 100° C. It is most advantageous to operate with temperatures in the mold lying within the range of from 120° to 150° C.

The following examples serve to illustrate the invention but they are not intended to limit it thereto, the parts and percentages being by weight:

EXAMPLES (A) 3 times 500 parts of polyethylene terephthalate in granular form, which had a content of 0.4% of talcum, a moisture content of 0.008% and a reduced specific viscosity of 1.40 dl./g., were subjected to rotation, at 75° C., with the following 3 silicon compounds, respectively:

(1) 0.1% of Si(O-nC₄H₉)₄
(2) 0.15% of Si(O-n C₁₂H₂₅)₄
(3) 0.15% of Si 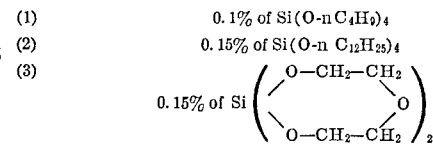

The granules coated in this manner were injection-molded by means of an injection-machine into sheets of dimensions 60 x 60 x 2 mm. Each charge was subjected to the same injection conditions: temperature of the cylinder 270°/260°/260° C., temperature of the mold 140° C., injection pressure 140 atmospheres gage, injection time 15 seconds, while the residence time in the mold was varied. The results are listed in the table following hereunder.

(B) 500 parts of polyethylene terephthalate in granular form containing 0.5% of a copolymer of ethylene and methacrylic acid containing sodium ions, which had a moisture content of 0.008% and a reduced specific viscosity of 1.40 dl./g., were subjected to rotation at room temperature together with the following two silanes, respectively:

(1) 0.1% of Si(O-nC₄H₉)₄
(2) 0.15% of (CH₃)₂Si 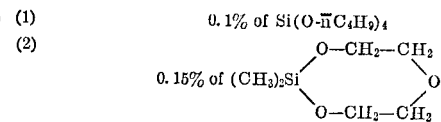

The further treatment was effected as described under (A). The results are listed in the table.

(C) In comparison with the processes carried out under (A) and (B), there are listed in the table the observations and values with respect to a polyester material containing only 0.5% of a copolymer of ethylene and methacrylic acid containing sodium ions, or 0.4% of talcum, and no silicon compound.

TABLE

| Test | Silicon compound amount (percent by weight) | Nucleating agent amount (percent by weight) | Residence time in the mold (seconds) | Density $d$ | SV prior to injection molding Prior to | SV after injection molding After | Removability from the mold; and appearance of the injection-molded articles. |
|---|---|---|---|---|---|---|---|
| A | $Si(O-nC_4H_9)_4$ (0.1) | Talcum (0.4) | 2<br>5<br>15<br>30 | 1.378<br>1.379<br>1.378<br>1.379 | 1,400 | 1,260 | Sheets fall from the mold; plane glossy surface. |
|  | $Si(O-nC_2H_{25})_4$ (0.15) | Talcum (0.4) | 2<br>5<br>15<br>30 | 1.378<br>1.378<br>1.379<br>1.380 | 1,400 | 1,245 | Sheets fall from the mold; plane glossy surface. |
|  | 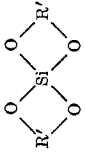 (0.15) | Talcum (0.4) | 2<br>5<br>15<br>30 | 1.378<br>1.378<br>1.379<br>1.379 | 1,400 | 1,255 | Sheets fall from the mold; plane glossy surface. |
| B | $Si(O-nC_4H_9)_4$ (0.1) | Ionic copolymer (0.5) | 2<br>5<br>15<br>30 | 1.377<br>1.378<br>1.377<br>1.378 | 1,420 | 1,260 | Sheets fall from the mold; plane glossy surface. |
|  | 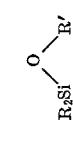 (0.15) | Ionic copolymer (0.5) | 2<br>5<br>15<br>30 | 1.378<br>1.377<br>1.378<br>1.378 | 1,420 | 1,265 | Sheets fall from the mold; plane glossy surface. |
| C | No addition | Talcum (0.4) | 2<br>5<br>15<br>30<br>60 | 1.374<br>1.375<br>1.376<br>1.378<br>1.380 | 1,400 | 1,220 | Sheets stick to the walls of the mold; wavy sheets with rough surface. |
|  | No addition | Ionic copolymer (0.5) | 2<br>5<br>15<br>30<br>60 | 1.372<br>1.372<br>1.374<br>1.376<br>1.378 | 1,420 | 1,235 | Sheets of 2-15 mm. thickness stick strongly to the walls of the mold good removability of sheets of 30-60 mm. thickness; wavy sheets with rough surface, satisfactory surface. |

We claim:

1. A thermoplastic molding composition consisting essentially of (a) a linear saturated polyester of an aromatic dicarboxylic acid and a saturated aliphatic or cycloaliphatic diol, (b) from 0.05 to 2% by weight, calculated on the weight of the polyester, of an inert, inorganic solid material, and (c) from 0.05 to 2% by weight, calculated on the weight of the polyester, of a silicon compound having the formula $$[R_mSi(OR_1)_{4-m}] \quad (I)$$

or $$(II)$$

or $$(III)$$

or a mixture thereof wherein R, $R_1$ and $R_2$ represent identical or different alkyl-, cycloalkyl-, aryl- or aralkyl groups containing up to 20 carbon atoms, R' represents an alkylene-, cycloalkylene-, aralkylene-, arylene-, or ether group containing up to 10 carbon atoms, and $m$ represents an integer from zero to 3, said composition containing less than 0.01% by weight water, calculated on the weight of the polyester.

2. A thermoplastic molding composition as claimed in claim 1, wherein the linear saturated polyester is polyethylene terephthalate.

3. A thermoplastic molding composition as claimed in claim 1 wherein the linear saturated polyester is polycyclohexane-1,4-dimethylol terephthalate.

4. A thermoplastic molding composition as claimed in claim 2, wherein the linear saturated polyester contains, in addition to terephthalic acid units, other aromatic or aliphatic dicarboxylic acids as acid component.

5. A thermoplastic molding composition as claimed in claim 4, wherein the linear saturated polyester contains, in addition to terephthalic acid units, as a further dicarboxylic acid, a member selected from the group consisting of isophthalic acid, naphthalene-1,6-dicarboxylic acid or adipic acid.

6. A thermoplastic molding composition as claimed in claim 2, wherein the linear saturated polyester contains, in addition to ethylene glycol units, other aliphatic diols as diol component.

7. A thermoplastic molding composition as claimed in claim 6, wherein the linear saturated polyester contains, in addition to ethylene glycol units, other aliphatic diols selected from the group consisting of neopentyl glycol or butanediol-1,4 as diol component.

8. A thermoplastic molding composition as claimed in claim 1, wherein the linear saturated polyester also contains hydroxycarboxylic acids as acid component.

9. A thermoplastic molding composition as claimed in claim 1, wherein the linear saturated polyester has a reduced specific viscosity within the range of from 0.6 to 2.0 dl./g. (measured in a 1% solution in a 60:40 by weight mixture of phenol and tetrachloroethane at 25° C.).

10. A thermoplastic molding composition as claimed in claim 1, wherein the linear saturated polyester has a reduced specific viscosity within the range of from 0.9 to 1.6 dl./g.

11. A thermoplastic molding composition as claimed in claim 1, wherein the linear saturated polyester has a reduced specific viscosity within the range of from 1.1 to 1.5 dl./g.

12. A thermoplastic molding composition as claimed in claim 1, which has a content of from 0.2 to 1 percent by weight of an inert inorganic solid material.

13. A thermoplastic molding composition as claimed in claim 1, in which the inert inorganic solid material has a particle size below 5 microns.

14. A thermoplastic molding composition as claimed in claim 1, wherein the inert inorganic solid material has a particle size below 2 microns.

15. A thermoplastic molding composition as claimed in claim 1, which has a content of from 0.1 to 0.5 percent by weight, calculated on the polyester, of a silicon compound of Formulae I, II or III, or mixtures of these compounds.

16. A shaped, injection molded article obtained from the thermoplastic composition defined in claim 1.

References Cited

UNITED STATES PATENTS

| | | | |
|---|---|---|---|
| 3,471,439 | 10/1969 | Bixler et al. | 260—41 |
| 2,645,624 | 7/1953 | Hunter | 260—29.1 |
| 3,308,092 | 3/1967 | Lentz | 260—46.5 |
| 3,332,900 | 7/1967 | Reischl | 260—29.1 |
| 3,503,128 | 3/1970 | Boyd | 32—15 |

FOREIGN PATENTS

| | | |
|---|---|---|
| 1,010,043 | 11/1965 | Great Britain. |

OTHER REFERENCES

Silane Coupling Agents, Slerman et al.: Reinforced Plastics Symposium, vol. 58, No. 3, March 1966.

Chem. Abstracts, 4280c, vol. 57.

MORRIS LIEBMAN, Primary Examiner

S. M. PERSON, Assistant Examiner

U.S. Cl. X.R.

260—40 R, 448.8 R, 448.8 A